Figure 1:
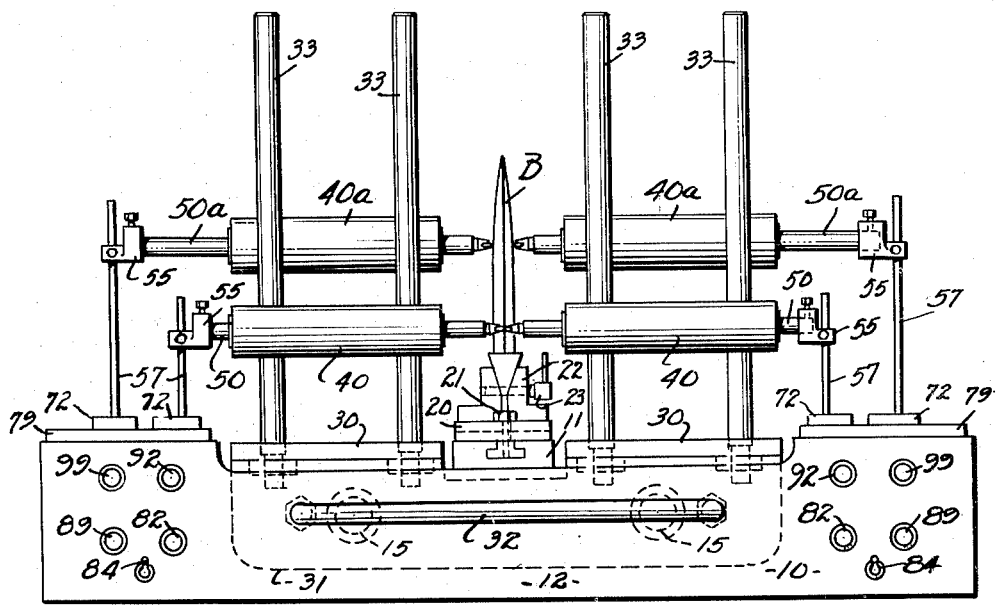

May 3, 1955  J. H. BREISCH  2,707,321
METHOD OF COMPARING ARTICLES WITH A STANDARD
Filed June 17, 1949  5 Sheets-Sheet 1

INVENTOR.
JOHN H. BREISCH
BY
Bates, Teare, & McBean
Attorneys

May 3, 1955  J. H. BREISCH  2,707,321
METHOD OF COMPARING ARTICLES WITH A STANDARD
Filed June 17, 1949  5 Sheets-Sheet 2
Fig.3
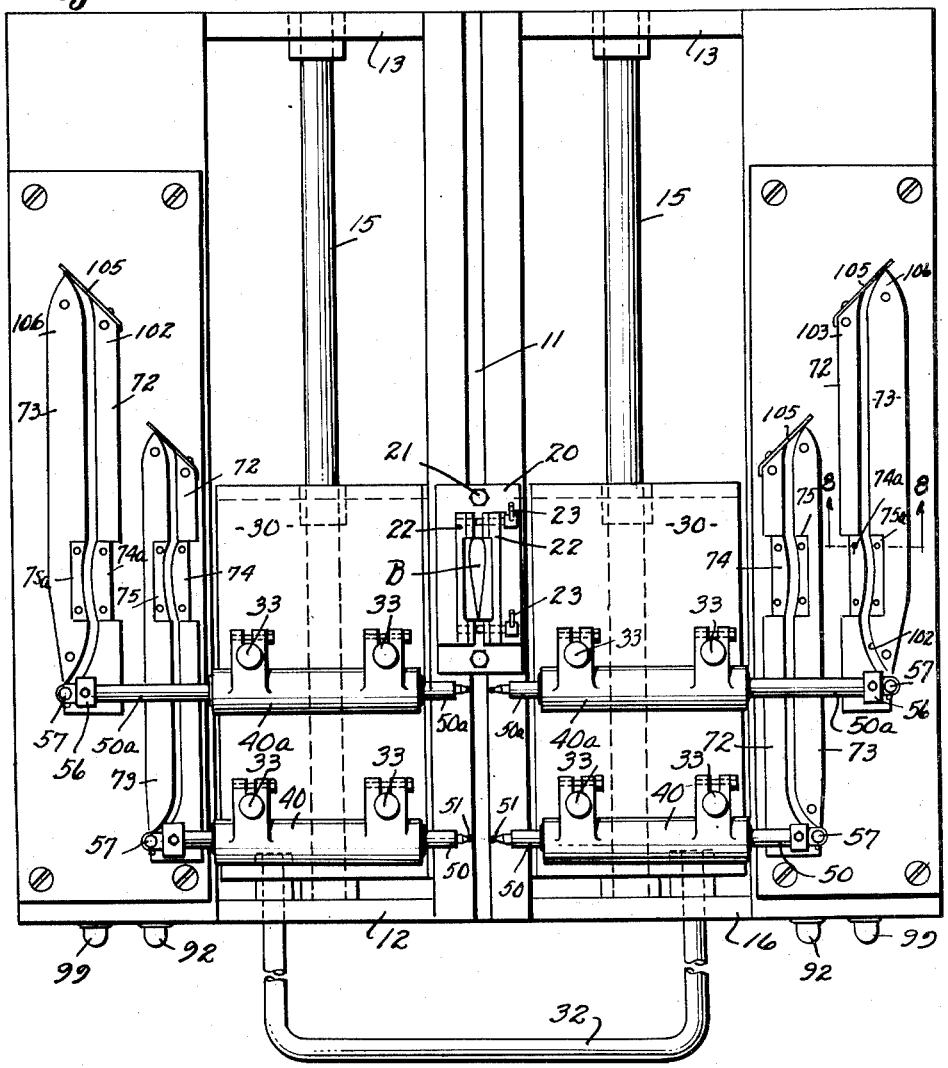
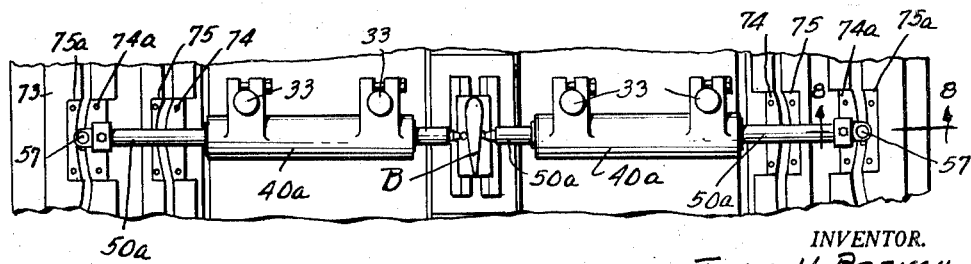
Fig. 4
INVENTOR.
JOHN H BREISCH
BY
Bates, Teare, & McBean
Attorneys May 3, 1955  J. H. BREISCH  2,707,321
METHOD OF COMPARING ARTICLES WITH A STANDARD
Filed June 17, 1949  5 Sheets-Sheet 4
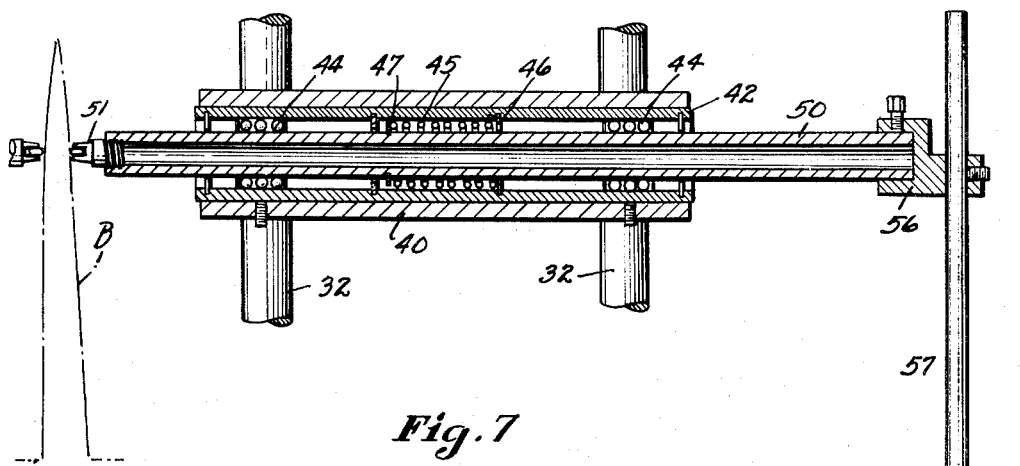
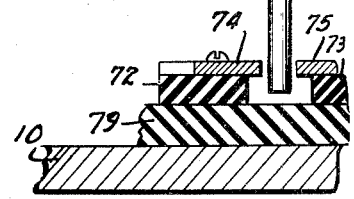
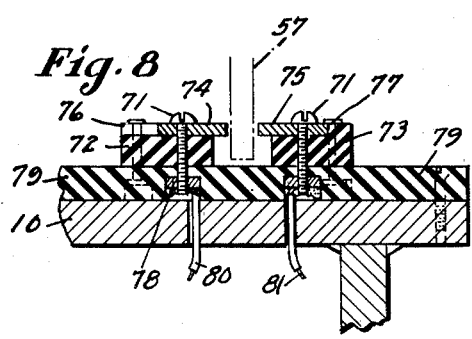
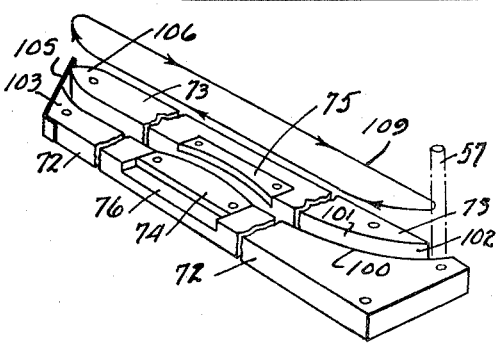
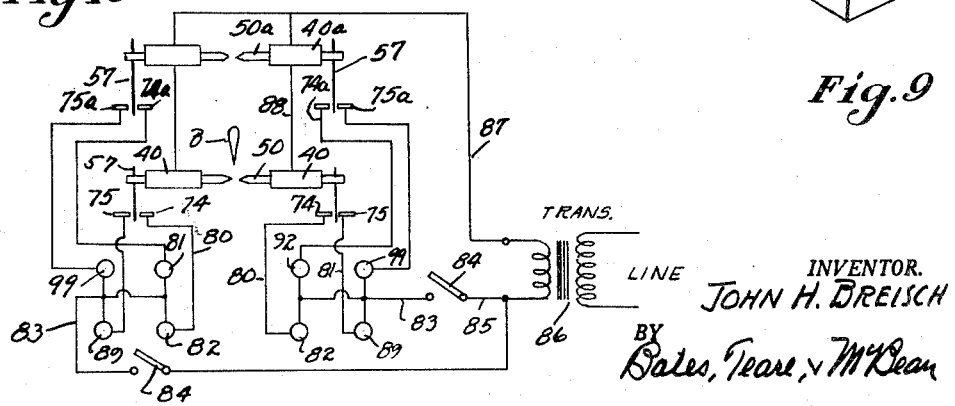
INVENTOR.
JOHN H. BREISCH
BY
Bates, Teare, McKean
Attorneys May 3, 1955     J. H. BREISCH     2,707,321
METHOD OF COMPARING ARTICLES WITH A STANDARD
Filed June 17, 1949     5 Sheets-Sheet 5

INVENTOR.
JOHN H. BREISCH
BY
Bates, Teare, & McBean
Attorneys

United States Patent Office 2,707,321
Patented May 3, 1955

2,707,321

METHOD OF COMPARING ARTICLES WITH A STANDARD

John H. Breisch, Lakewood, Ohio, assignor to Measuring Machines, Inc., Rocky River, Ohio, a corporation of Ohio Application June 17, 1949, Serial No. 99,622

4 Claims. (Cl. 29—407)

This invention relates to a system of comparing the transverse measurement or profile of an article with a standard to indicate the accuracy of the article. The invention provides for measuring a standard article and developing a templet in accordance with such measurement and subsequently measuring the article to be tested according to its conformity or non-conformity with the templet. An apparatus useful in carrying out my method is shown in the accompanying drawings.

The machine shown provides for moving the measuring member with reference to the article to indicate contours; also for taking a plurality of measurements at the same time. While my measuring machine is adapted for making a single measurement, or tracing a single contour on one side of the article, I prefer to increase the number of measuring feelers, templets and indicators, so that at least two profiles may be traced simultaneously on one side of the article, and I duplicate the apparatus on the other side so that at least two profiles may at the same time be traced on that face of the article. The construction illustrated in the drawing carries out this method of testing of two profiles on each side.

Figure 2:
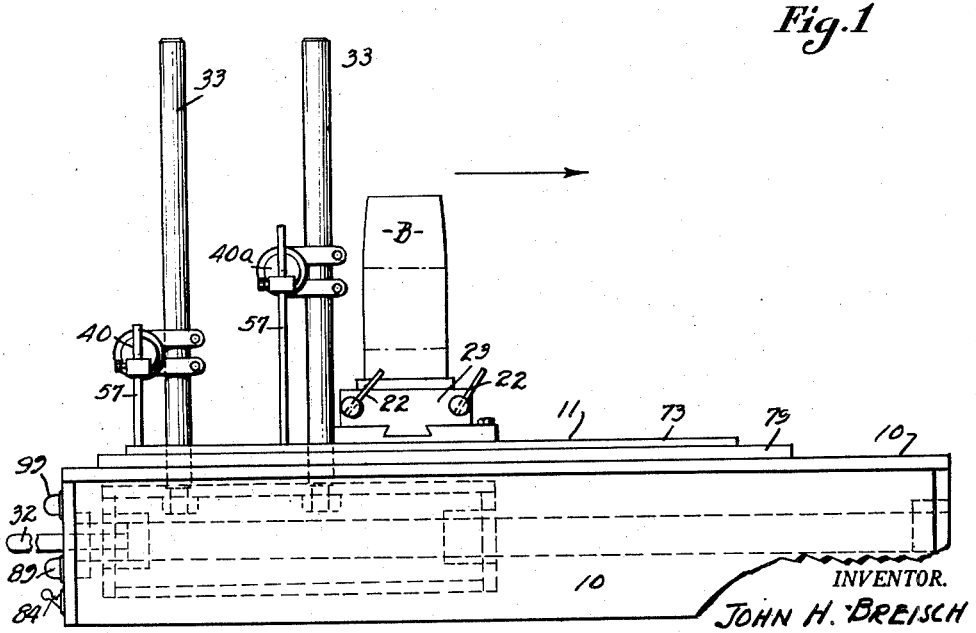
Figure 5:
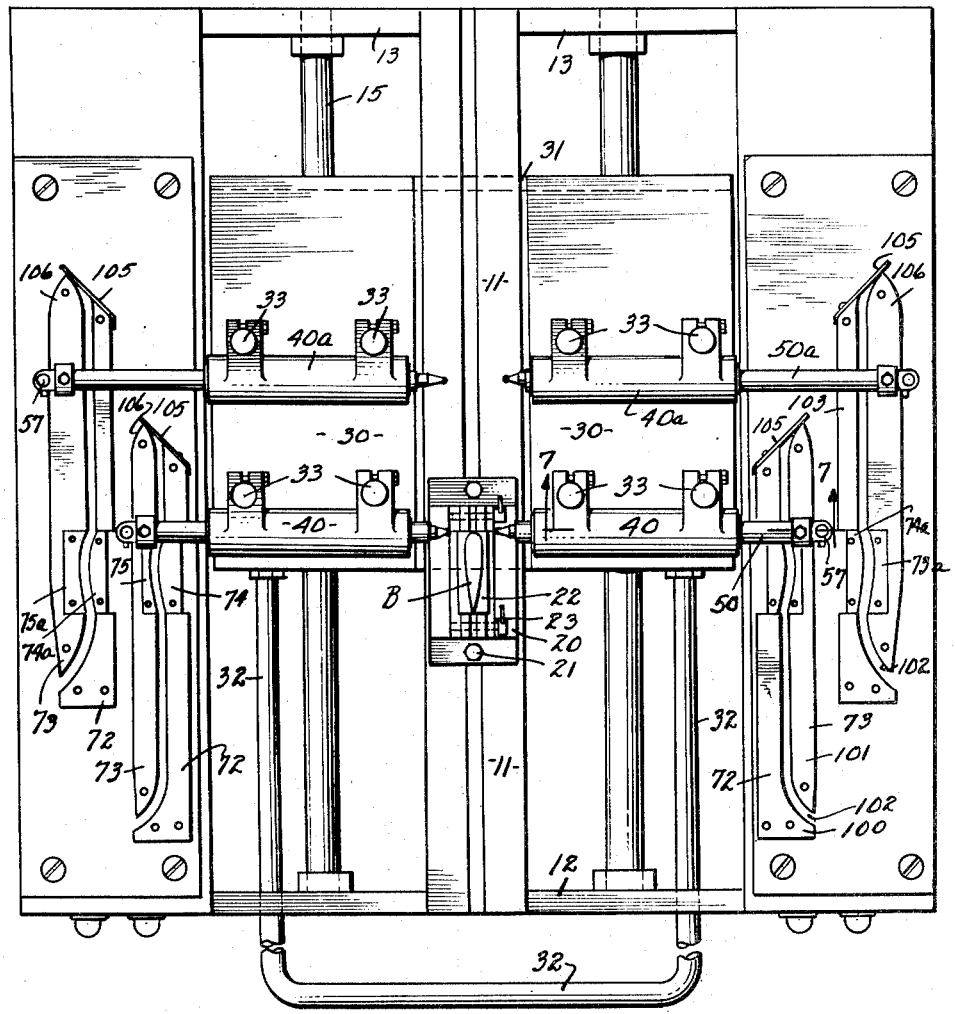
Figure 6:
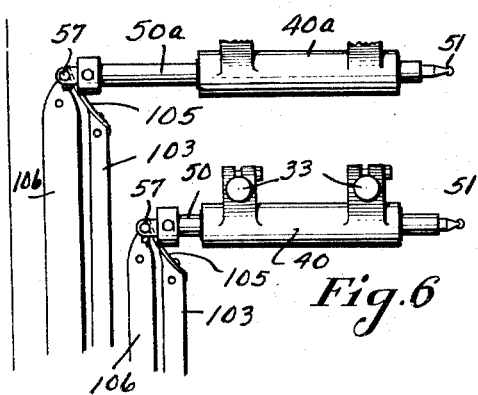
Figure 11:
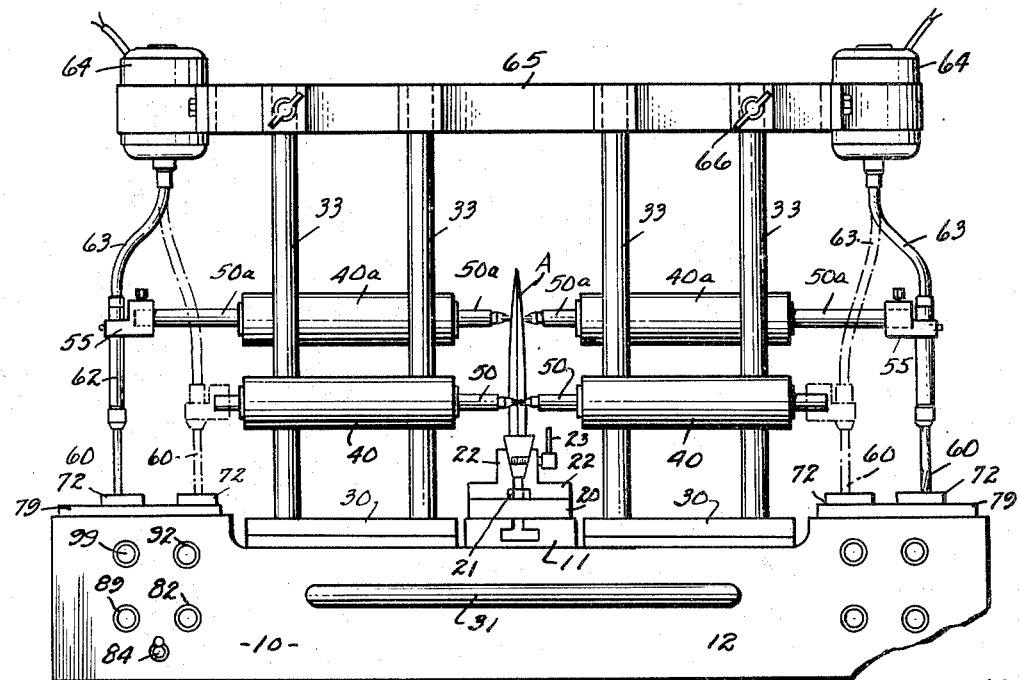
Figure 12:
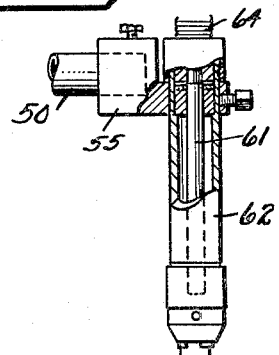
Figure 13:
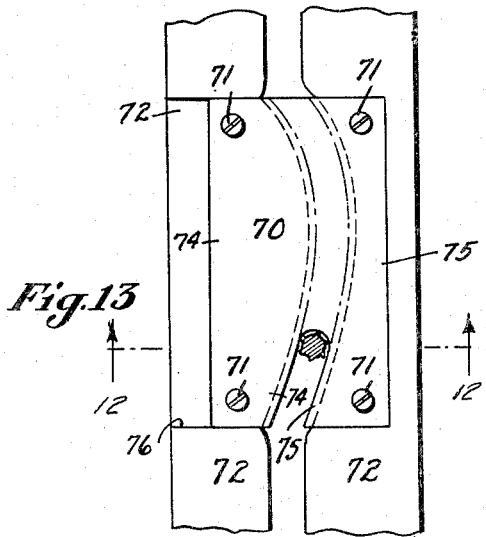

In the drawings, Fig. 1 is a front elevation of a machine useful in performing this invention; Fig. 2 is a side elevation thereof, partly broken away; Fig. 3 is a plan of this machine, with the parts in idle position preliminary to the measurement; Fig. 4 is a fragmentary plan of an intermediate portion of the machine, showing parts in an active position; Fig. 5 is a plan corresponding to Fig. 3 but with the parts in the act of returning to original position, following the measurement; Fig. 6 is a fragmentary view in the nature of a plan of certain parts shown in Figs. 1, 3 and 5 but in a different position; Fig. 7 is a sectional elevation of a portion of the apparatus in position acting on an article to be tested, being a vertical section on the line 7—7 on Fig. 5 but on a larger scale; Fig. 8 is a detail in vertical cross section, as indicated for instance by the line 8—8 on Figs. 3 and 4; Fig. 9 is a perspective of a portion of the machine carrying the templet; Fig. 10 is a diagram showing electric circuits which may be employed between the measuring members and the certain indicating devices; Fig. 11 is a front elevation of the apparatus in position for forming the templet in accordance with the measurement of the standard article; Fig. 12 is a vertical section in a plane parallel with Fig. 11 and on a larger scale, illustrating the cutting of the templet, the position of the cutter being illustrated, for instance, in the line 12—12 on Fig. 13; Fig. 13 is a plan illustrating the cutting member and the templet being formed thereby.

In the drawings, 10 indicates a suitable bed carrying the entire apparatus. Located centrally of this bed is a fore-and-aft slideway 11 forming a bridge from the front frame wall 12 to the rear wall 13. On this slideway is mounted a slidable carriage 20, which may be locked in any position on the slideway 11 by means of clamping bolts 21. This carriage is equipped with a pair of clamping plates 22, one of which is movable by hand screws 23 to clamp fixedly either the standard article as A, Fig. 11, for measurement in formation of the templet, or articles as B in various other figures which are to be tested in accordance with the templet.

The bed 10 carries respectively on opposite sides of the slide-way 11 a pair of fore-and-aft guide bars 15 rigidly secured to the front wall 12 and the rear wall 13 of the bed. Slidable on these guide bars is a carriage 30 having two platforms spaced on opposite sides of the slideway 11 and connected together by transverse bars 31 extending beneath the slideway. To the front of the carriage is secured a bail 32 having its side arms slidable through the front wall 12 of the bed. This bail therefore furnishes means for manually moving the carriage 30 toward and from the rear.

The carriage 30 has a number of upright bars 33, four being shown for each of the carriage platforms. Adjustably clamped to adjacent bars 33 are transverse barrels 40, and 40a four being shown. These barrels, as hereinafter explained, house horizontally movable feeler rods adapted to engage the surface of the article carried by the clamp 22 and either control the formation of the templet with reference to the article, or coact with a templet already formed to effect indications as to the accuracy of the surface of the article, according to whether it is the standard article A or the article B to be tested.

As the construction of each of the barrels and the movable feeler member housed therein is substantially the same for each barrel, a description of one will suffice. This construction is best shown in Fig. 7, where the barrel 40, or 40a open at each end, is shown with a liner tube 42. Within this tube 42 is a feeler rod 50 (or 50a for the barrel 40a) which may itself be a tube. This rod 50 is mounted for longitudinal movement in the barrel liner by interposed ball bearings 44. I also provide a helical spring 45 between the rod 50 and the liner tube, the spring being compressed between an inwardly projecting stop 46, carried by the liner and an outwardly projecting stop 47 on the rod, the spring therefore pressing the rod toward the article B to be measured.

The rod 50 has at its inner end a fitting 51 carrying a diminutive wheel or pointer to engage the article to be measured. At its other end the rod carries a fitting secured to it. This fitting is of the form shown at 55 in Figs. 11 and 12 for the formation of the templet and of the form shown at 56 in other figures for carrying a vertical rod 57 to coact with the finished templet for the subsequent measurement, as indicated in Figs. 1 and 7.

In the formation of the templet under the control of the same rod 50 I utilize the construction illustrated in Figs. 11 to 13. This comprises a milling cutter 60 driven by a shaft 61 in a tubular housing 62 which is clamped in the bracket 55 on the rod 50. The shaft 61 is a continuation of the flexible shaft 63 driven by a motor 64. This motor is clamped in the projecting end of a transverse bar 65 which is clamped to some of the upright posts 33, wing nuts 66 being shown for this purpose.

The material for the templet comprises a flat horizontal metallic plate 70 secured as by screws 71 to a pair of bars 72 of insulating material. After the milling cutter has traveled a course from front to back of the plate 70, by the manual shifting of the cutter by the bail 32, there results two opposed templet members 74 and 75, each of which is insulatingly mounted and adjacent edges of which correspond with the contour of the standard article. As hereinafter described, these templets form electric terminals of indicator circuits which may be energized by contact of the measuring rod 57 with either templet.

The metal plate 70 seats in recesses in the top surface of the insulating bars 72 and 73. The recess 76 in the bar 72 extends clear across it. The aligning recess in the bar 73 terminates short of the outer edge of that bar, leaving a rib 77 to form an abutment and positioner for the original plate 70 which may be readily shoved into place across the open recess 76.

The screws 71 which secure the formed templet plates 74 and 75 in place pass through the insulating bars 72 and 73 and are held by nuts 78 (Fig. 8) in cavities in a supporting insulating plate 79 mounted on the bed of the machine. To the underside of these nuts, respectively, are soldered the ends of two insulated wires 80 and 81. The conductor 80 from the templet 74 leads through an electric indicator 82 (Fig. 10), which may be a lamp, to a conductor 83. This conductor may be connected by a switch 84 with a conductor 85 which forms the secondary in a transformer 86. Thence the circuit continues via the conductors 87 and 88 to the housing 40 carrying the measuring rod 50. The line 81 from the templet 75 leads through the indicator 89 to the same return line 83 and thence back to the measuring rod 50.

It results from the above described circuit arrangement that if the rod 57 contacts with the templet 74 an energized circuit is established through the indicator 82 which thus shows such contact condition. On the other hand if the rod 57 contacts with the templet 75 a similar circuit is established through the lamp 89 which becomes illuminated to indicate contact with that terminal.

As shown in Fig. 7, there is a normal clearance between the rod 57 in each of the templets, the amount of this clearance being equal to the tolerance permitted in the variation of the article being measured from the standard, this tolerance being of course much exaggerated in Fig. 7. Accordingly, if the measuring rod 50 with the rod 57 attached is shoved along in contact with the article to be measured, no indication results on the test lamps 82 or 89 so long as the rod 57 does not contact with either templet. However, if the article being measured is too thin or recessed the movement of the rod 57 toward the article under the influence of the spring 45 causes the rod to contact with the templet 74 and the lamp 82 thus becomes illuminated. If, on the other hand, the article is too thick in the region measured, or has an outward projection, the rod 57 is forced into engagement with the templet 75 and the lamp 89 becomes illuminated.

If either lamp becomes illuminated as the article is progressed across the measuring point the article is considered faulty and discarded. If the progress of the article past the testing point causes no illumination, the article is considered correct within the tolerances allowed.

To enable the depending test rod 57 to pass readily into the space between the mating templets on the rearward stroke of the rod and to return by another path, I provide the mechanism shown in plan in Figs. 1 and 3 and illustrated in perspective in Fig. 9. In effecting this, I extend the insulating bars 72 and 73 toward the front of the machine in front of their respective templets as indicated at 100 and 101 and I divert the passageway 102 between them to the outer side of the bars. The bars are also extended to the rear and the extension 103 of the inner bar 100 there carries a spring plate 105 which normally abuts the rear end of the extension 106 of the outer bar, which is narrowed practically to a point at the end.

The result from the above-described arrangement is that as the rod 57 in traveling between the templets is forced beyond them the spring plate 105 is engaged by the rod and the reaction of this spring plate (which is stronger than the spring 45) forces the rod toward the outside beyond the point of the bar 106, so that on the return stroke the rod lies on the outer side of the bar 106, thus returns to initial position along an idle path into position to re-enter the slot 102. This 4-way path of the rod 57 is indicated by the line of arrows 109 in Fig. 9.

I have described the electric operation with reference to only one of the measuring rods 50 carried by the barrel 40. I have shown two sets of indicators on that side, and the operation of the other measuring rod 50a, carried by the barrel 40a, is similar except that the circuits 90 and 91 from this pair of templates 74a and 75a pass through the lamps 92 and 99 corresponding to 82 and 89 to the return line 83, to the line 88, which line it will be seen leads both to the barrel 40a and the barrel 40. The indicating lamps 82, 89, 92, 99 and the switch 84 may readily be carried on the front skirt 12 of the machine, as shown in Fig. 1.

The entire measuring operation is duplicated on the other side of the machine, as shown in various figures. The description already given, and the reference numerals appearing on the right hand half of the machine apply equally well to the left hand half. Accordingly, in the embodiment shown I employ four sets of templets and take four contours, two on each side. The arrangement of indicators shown in Fig. 1 and in the diagram, Fig. 10, will be seen provided for four over-or-under tests, two on each side of the article. Contours at two crucial regions on each side are ordinarily sufficient to indicate the accuracy or non-accuracy of the article being tested. However, the number may be increased if desired. Also by adjusting the barrels 40 and 40a up-or-down on their respective standards, tests in different regions or additional regions may be made.

It will be seen that I have provided a simple machine useful in producing templets for ready comparison of the contours of an article with a standard. An illustration of the use of such a machine is the testing of turbine blades, where it is highly important that the curvature of each blade corresponds to a previously designed standard blade. Such standard blade may be readily mounted in the machine and provide for forming the templets in correspondence with it, and then the subsequent use of these templets determines the accuracy of the article being compared with the original. By using the templets for subsequent testing in the position where formed from the standard article, I save the time required to position the templets for use. However, if desired various templets may be made up in advance from various standard articles and stored for subsequent use.

I claim:

1. The method of comparing the surface contour of a production article with the surface contour of a standard article by, duplicating the surface contour in one direction of the standard article at a position displaced from said standard article, retaining said duplicate contour in its displaced position, then progressively comparing the surface contour in the same direction of the production article at the same displaced position with the first displaced duplicate contour, and simultaneously during said progressive comparison indicating the conformity or non-conformity of the production surface contour to said first displaced duplicate contour.

2. The method of comparing the surface contour of a production article with the surface contour of a standard article by progressively reproducing the surface contour at a selected transverse plane of the standard article and duplicating same at a position displaced from said standard article, retaining said duplicate contour in the displaced position, progressively comparing the surface contour at the same transverse plane of the production article and at the same displaced position with said duplicate standard contour, and simultaneously during said comparison indicating the conformity or non-conformity of the production surface contour with the displaced standard contour.

3. The method of comparing the surface contour of a production article with the surface contour of a standard article by duplicating the surface contour in one direction of the standard article at a position displaced from the standard article, retaining said duplicate contour in its displaced position, then progressively comparing the surface contour in the same direction of the production article at the same displaced position with the duplicate standard contour, while simultaneously translating the progressive conformity or non-conformity of said contours into electrical impulses, and progressively energizing an electrical indicator with such impulses to indicate the identity or lack of identity between the surface contours of the articles.

4. The method of comparing the surface contour of a production article with that of a standard article by continuously engaging the surface of the standard article while causing relative transverse movement in one direction between the standard article and the point of engagement, progressively transferring the position of the point of engagement to a region displaced from the surface of said standard article while causing the same relative transverse movement between said displaced region and the transferred positions of the point of engagement, progressively duplicating the transferred positions at such displaced region to provide a displaced contour substantially identical with that of said standard article, then replacing the standard article with the production article of similar configuration, continuously engaging the surface of said production article while causing the same transverse movement between said production article and the point of engagement in the same direction, progressively transferring the position of the point of engagement to the same displaced region while causing the same relative transverse movement between said displaced region and the transferred position of the point of engagement, and simultaneously comparing the last mentioned transferred positions of the point of engagement on the production article with said first transferred and duplicated positions of the point of engagement on the standard article by progressively indicating their identity or lack of identity.

References Cited in the file of this patent

UNITED STATES PATENTS

| Number | Name | Date |
|---|---|---|
| 648,287 | Owen | Apr. 24, 1900 |
| 1,084,155 | Lochman | Jan. 13, 1914 |
| 1,652,435 | Goodrich | Dec. 13, 1927 |
| 2,213,959 | Garrison et al. | Sept. 10, 1940 |
| 2,307,503 | Gulliksen | Jan. 5, 1943 |
| 2,351,626 | Muller | June 20, 1944 |
| 2,395,215 | Cochrane | Feb. 19, 1946 |
| 2,397,108 | Hanna | Mar. 26, 1946 |
| 2,412,619 | Kinderman et al. | Dec. 17, 1946 |
| 2,431,099 | Wiseman et al. | Nov. 18, 1947 |